(12) United States Patent
Irie et al.

(10) Patent No.: US 10,637,566 B2
(45) Date of Patent: Apr. 28, 2020

(54) TEST EQUIPMENT AND PROCESS OF EVALUATING OPTICAL MODULES

(71) Applicant: SUMITOMO ELECTRIC DEVICE INNOVATIONS, INC., Yokohama-shi (JP)

(72) Inventors: Takeshi Irie, Yokohama (JP); Kei Arakawa, Yokohama (JP); Katsuyuki Takahashi, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 16/170,340

(22) Filed: Oct. 25, 2018

(65) Prior Publication Data

US 2019/0123816 A1 Apr. 25, 2019

(30) Foreign Application Priority Data

Oct. 25, 2017 (JP) .................................. 2017-206163

(51) Int. Cl.
*H04B 10/071* (2013.01)
*H04J 14/02* (2006.01)
*H04B 10/073* (2013.01)

(52) U.S. Cl.
CPC ....... *H04B 10/071* (2013.01); *H04B 10/0731* (2013.01); *H04J 14/02* (2013.01)

(58) Field of Classification Search
CPC ... H04B 10/071; H04B 10/0731; H04J 14/02; G01R 31/2635
USPC ..................................................... 398/25–38
See application file for complete search history.

(56) References Cited

U.S. PATENT DOCUMENTS

| | | | |
|---|---|---|---|
| 8,798,110 B2* | 8/2014 | Takeuchi | H01S 5/3013 372/45.01 |
| 2007/0245189 A1* | 10/2007 | Ono | G01R 31/2635 714/724 |
| 2011/0252860 A1* | 10/2011 | Ono | H01S 5/0014 73/1.01 |
| 2015/0055131 A1* | 2/2015 | Ono | G01R 31/2635 356/244 |
| 2016/0005418 A1* | 1/2016 | Takahashi | G10L 21/0232 704/226 |

(Continued)

FOREIGN PATENT DOCUMENTS

JP 2007-271590 A 10/2007

*Primary Examiner* — Amritbir K Sandhu
(74) *Attorney, Agent, or Firm* — Baker Botts, L.L.P.; Michael A. Sartori

(57) ABSTRACT

Test equipment that is able to concurrently evaluate two or more optical modules each processing a wavelength multiplexed signal that multiplexes optical signals attributed to wavelengths different from each other. The test equipment provides a first test station and a second test station. After selecting one of the wavelengths, the first test station performs a first evaluation for an optical signal attributed to the one of the wavelengths and coming from the first optical module, and the second station concurrently performs a second evaluation for an optical single with the one of the wavelengths and coming from the second optical module. Thereafter, the first test station performs the first evaluation for the optical signal coming from the second optical module, while, the second test station performs the second evaluation for the optical signal coming from the first optical module.

20 Claims, 7 Drawing Sheets

(56) References Cited

U.S. PATENT DOCUMENTS

2019/0123816 A1* 4/2019 Irie .................... H04B 10/0731
2019/0149090 A1* 5/2019 Chiu ....................... H02S 50/15
                                                         324/761.01

* cited by examiner

TEST EQUIPMENT AND PROCESS OF EVALUATING OPTICAL MODULES

CROSS REFERENCE TO RELATED APPLICATION

The present application is based on and claims the benefit of priority of Japanese Patent Application No. 2017-206163, filed on Oct. 25, 2017, the entire content of which is incorporated herein by reference.

BACKGROUND OF INVENTION

1. Field of Invention

The present invention relates to test equipment for evaluating optical modules, in particular, optical modules with a function of transmitting and receiving wavelength multiplexed signals.

2. Related Prior Arts

An optical transmitter that generates optical signals is necessary to be evaluated using test equipment before shipment thereof. A Japanese Patent laid open No. JP2007-271590A has disclosed such test equipment. A light-emitting device implemented within the optical module generates an optical signal through which the test equipment evaluates the optical module. One type of an optical module has a function to process a wavelength multiplexed signal, namely, transmitting and/or receiving a wavelength multiplexed signal. The test equipment is necessary to evaluate the optical module for respective wavelengths as re-setting test functions for the respective wavelengths, which takes an enough tact time.

SUMMARY

One aspect of the present invention relates to test equipment that evaluates first and second optical modules each processing wavelength multiplexed signals that multiplex optical signals attributed to wavelengths specific thereto and different from each other. The wavelengths attributed to the first optical module are substantially equal to the wavelengths attributed to the second optical module. The test equipment of the invention comprises a first test station, a second test station, and a controller. The first test station performs a first evaluation for the first and second optical modules using one of the optical signals output from the first optical module and another one of the optical signals output from the second optical module, respectively. The second test station performs a second evaluation for the first and second optical modules using the one of the optical signals and the another one of the optical signals, respectively. The controller controls a turn of the first evaluation and the second evaluation. The first test station and the second test station concurrently perform the first evaluation for the first optical module and the second evaluation for the second optical module, respectively, in a first period and concurrently perform the second evaluation for the first optical module and the first evaluation for the second module, respectively, in a second period subsequent to the first period. A feature of the test equipment of the invention is that the first evaluations and the second evaluations for the first optical module and the second optical module are iterated with respect the respective wavelengths.

Another aspect of the present invention relates to a process of evaluating a first optical module and a second optical module. The first and second optical modules process wavelength multiplexed signals that multiplex optical signals each having wavelengths specific thereto and different from each other. The process of the invention comprises steps of: (a) selecting one of the wavelengths; (b) providing one of the optical signals having the one of the wavelengths output from the first optical module to a first test station and another one of the optical signals having the one of the wavelengths output from the second optical module to a second test station; (c) concurrently performing a first evaluation for the first optical module at the first test station using the one of the optical signals and a second evaluation for the second optical module at the second test station using the another one of the optical signals in a first period; (d) concurrently performing the first evaluation for the second optical module at the first test station using the another one of the optical signals and the second evaluation for the first optical module at the second test station using the one of the optical signals in a second period subsequent to the first period; and iterating the steps (a) to (d) for the respective wavelengths.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment according to the present invention will be described referring to accompanying drawings. The present invention, however, is not restricted to the embodiment, and has a scope defined in claims attached and all modification and changes of elements in the claims and equivalents thereto. In the description of the drawings, numerals or symbols same with or similar to each other will refer to elements same with or similar to each other without duplicating explanations.

[Test Equipment]

Figure 1:
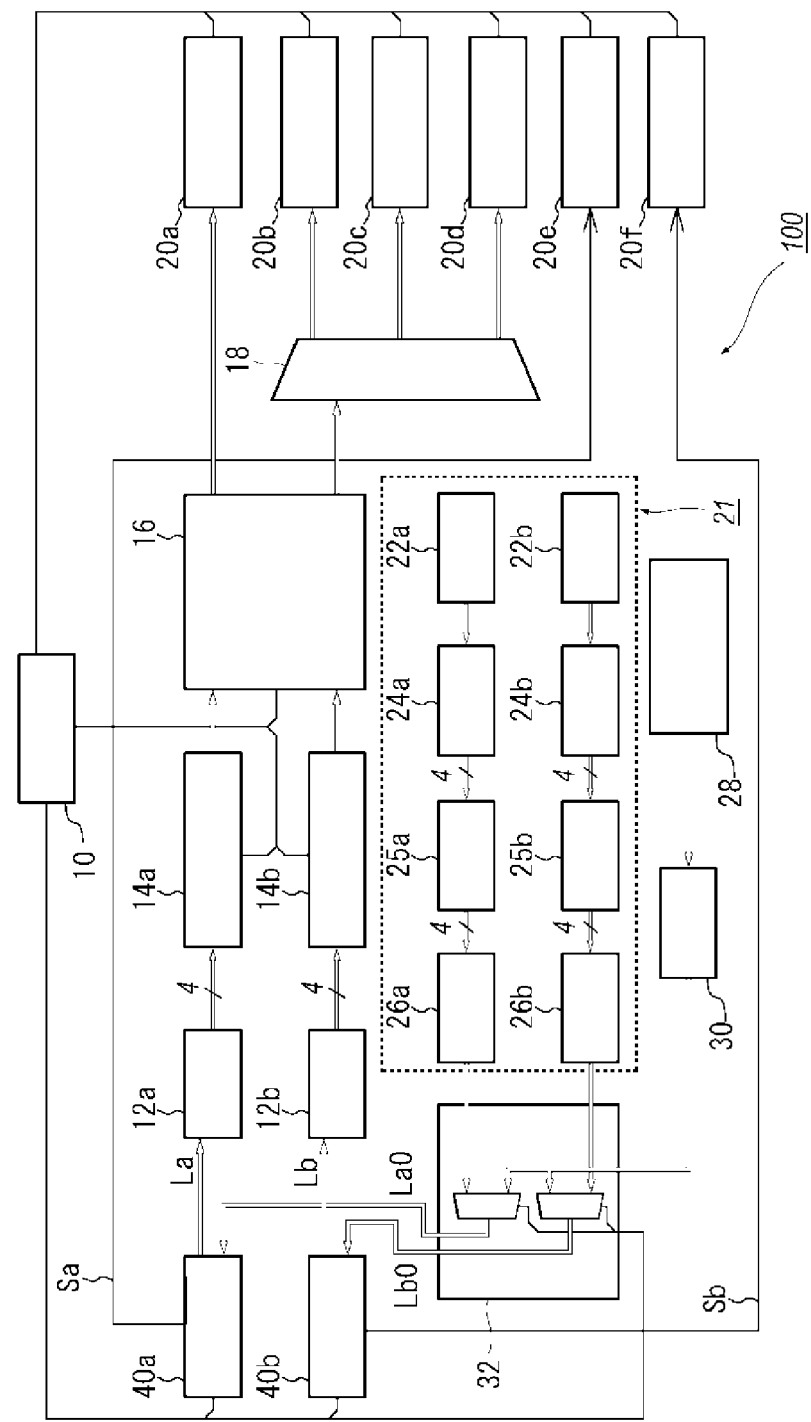
FIG. 1 shows a functional block diagram of the test equipment.

Test equipment 100 according to embodiment of the present invention evaluates devices under test (DUT), 40a and 40b. FIG. 1 shows a functional block diagram of the test equipment 100 that includes a controller 10, optical de-multiplexers, 12a, 12b, 24a, and 24b, 4:1 selectors, 14a and 14b, a 2:2 selector 16, an optical splitter 18, test stations, 12a to 12*d*, test stations, 12*e* and 12*f*, an optical source 21, an supplemental optical source 28, an optical amplifier 30, and a 3 to 2 selector 32.

The controller 10, which may be, for instance, a personal computer, includes a central processing unit (CPU) and a storage such as a hard disc drive (HDD) and/or a solid state drive (SSD). The controller 10 may control and manage the evaluations performed for the DUTs, 40*a* and 40*b*, by executing programs stored in the storage. Specifically, the controller 10 may select one of wavelengths attributed to the optical signals in respective DUTs, 40*a* and 40*b*, by setting the 4:1 selectors, 14*a* and 14*b*, and the 2:2 selector 16. Also, the controller 10 may initialize the test stations, 20*a* to 20*d*, and selects optical paths from the multi-wavelength optical sources, 22*a* and 22*b*, to the DUTs, 40*a* and 40*b*, by managing the 3 to 2 selector 32.

The optical source 21 includes multi-wavelength optical sources, 22*a* and 22*b*, optical attenuators, 25*a* and 25*b*, optical multiplexers, 26*a* and 26*b*. The multi-wavelength optical source 22*a* may generate a wavelength multiplexed signal that multiplexes, for instance, four optical signals each having respective wavelengths different from each other. The optical de-multiplexer 24*a* de-multiplexes the wavelength multiplexed signal into four optical signals depending on the wavelengths thereof. The optical attenuator 25*a* independently attenuates strengths of the optical signals provided from the optical de-multiplexer 24*a*, and the optical multiplexer 26*a* multiplexes thus attenuated optical signals into a wavelength multiplexed signal. That is, the optical de-multiplexer 24*a*, the optical attenuator 25*a*, and the optical multiplexer 26*a* may generate the wavelength multiplexed signal that multiplexes four optical signals each having wavelengths different from each other and strengths independently adjusted by the optical attenuator 25*a*. The other path of the multi-wavelength optical source 22*b*, the optical de-multiplexer 24*b*, the optical attenuator 25*b*, and the optical multiplexer 26*b* have the function same with those above described. That is, the other path may generate another wavelength multiplexed signal that multiplexes four optical signals each having wavelengths different from each other and strengths independently adjusted.

The supplemental optical source 28 provides another optical signal to the optical amplifier 30. The optical amplifier 30 amplifies a strength of the another optical signal and provides thus amplified another optical signal to the 3 to 2 selector 32. The 3 to 2 selector 32 generates an optical signal La0 and another optical signal Lb0 where the former La0 is one of the wavelength multiplexed signal provided from the optical multiplexer 26*a* and the amplified optical signal provided from the optical amplifier 30, while the latter Lb0 is one of the another wavelength multiplexed signal provided from the optical multiplexer 26*b* and the amplifier optical signal provided from the optical amplifier 30. These two optical signals, La0 and Lb0, are provided to the DUTs, 40*a* and 40*b*, respectively.

[Device Under Test (DUT)]

The DUTs, 40*a* and 40*b*, may be optical transceivers type of, for instance, C Form-factor Pluggable (CFP), Quad Small Form-factor Pluggable 28 (QSFP 28), and so on. The DUTs, 40*a* and 40*b*, receives wavelength multiplexed signals, La0 and Lb0, from the 3 to 2 selector 32 and generates wavelength multiplexed signals, La and Lb, respectively. The wavelength multiplexed signal La output from the first DUT 40*a* and the other wavelength multiplexed signal Lb output from the second DUT 40*b* each multiplex four optical signals attributed to wavelengths different from each other.

Figure 2A:
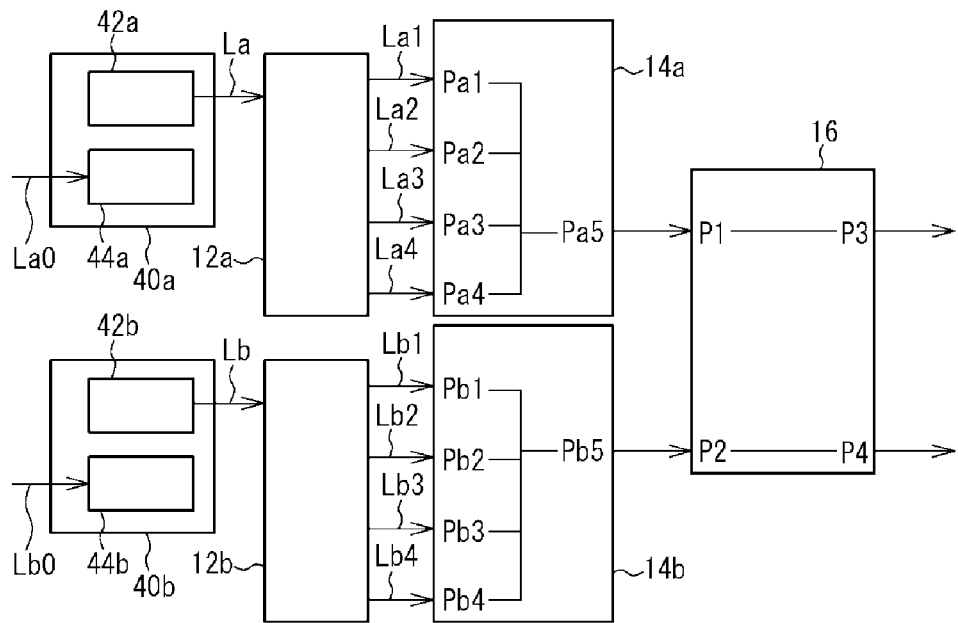
FIG. 2A and FIG. 2B magnify the 4:1 selectors and the 2:2 selector, where the 2:2 selector is in the parallel configuration and the cross configuration, respectively.
Figure 2B:
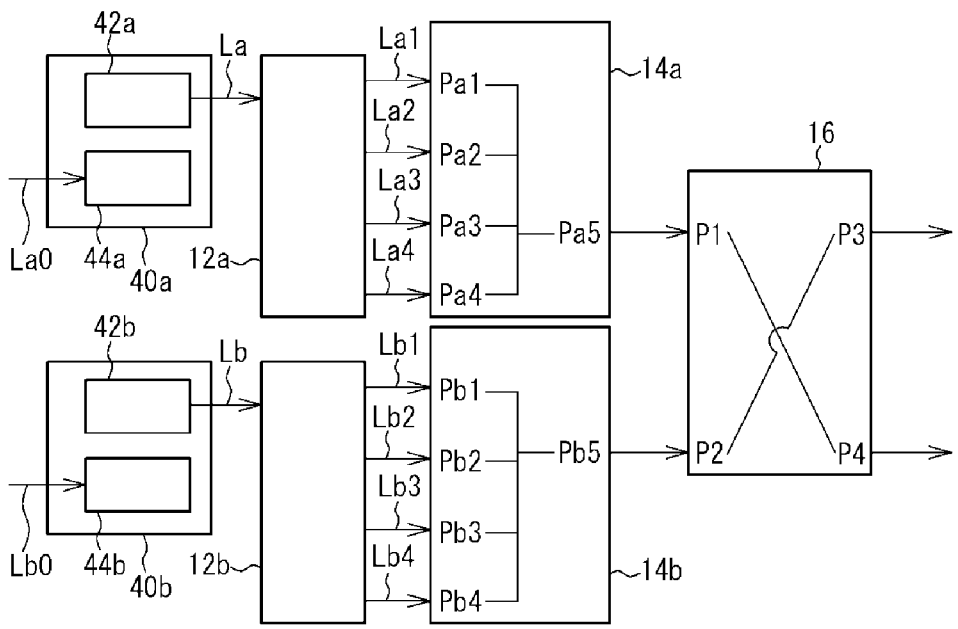

FIG. 2A and FIG. 2B magnify the 4:1 selectors, 14*a* and 14*b*, and the 2:2 selector 16, where FIG. 2A and FIG. 2B distinguishes a configuration in the 2:2 selector 16. The first DUT 40*a* implements a transmitter 42*a* and a receiver 44*a*, while, the second DUT 40*b* implements a transmitter 42*b* and a receiver 44*b*. The transmitters, 42*a* and 42*b*, may be a type of transmitter optical sub-assemblies (TOSA), while, the receivers, 44*a* and 44*b*, may be a type of receiver optical sub-assemblies (ROSA).

Figure 3A:
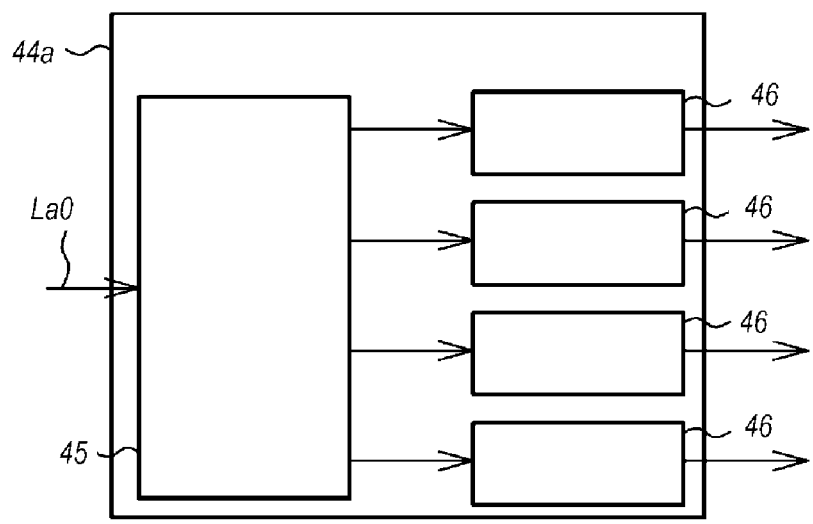
FIG. 3A is a functional block diagram of the ROSA in the device under test (DUT)

FIG. 3A is a functional block diagram of the ROSA 44*a* in the first DUT 40*a*. The ROSA 44*a* includes an optical de-multiplexer 45 and four light-receiving devices 46, which may be a type of photodiode (PD). The optical de-multiplexer 45 de-multiplexes the wavelength multiplexed signal La0 provided from the 3 to 2 selector 32 into four optical signals depending on the wavelengths thereof. The light-receiving devices 46 may receive thus de-multiplexed four optical signals independently and generate four electrical signals depending on the strengths of the optical signals. The other receiver 44*b* in the second DUT 40*b* has an arrangement same with the arrangement of the receiver 44*a* described above.

Figure 3B:
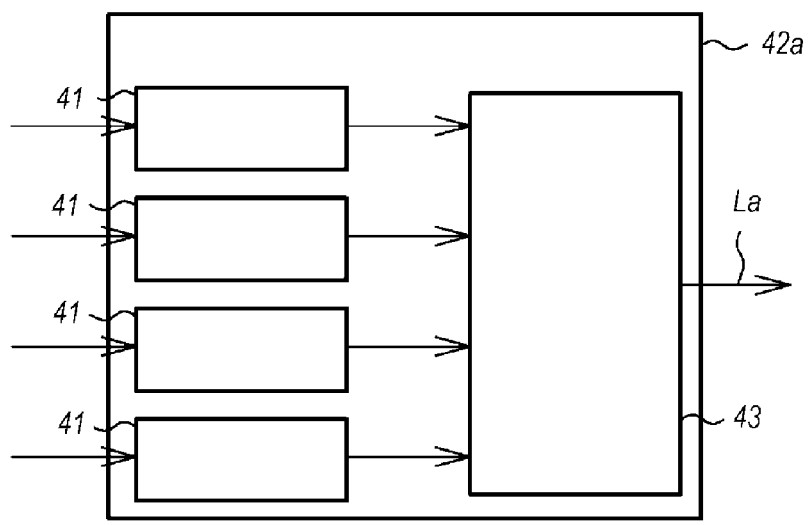
FIG. 3B is a functional block diagram of the transmitter in the DUT.

FIG. 3B is a functional block diagram of the transmitter 42*a*. The transmitter 42*a* provides four light-emitting devices 41 and an optical multiplexer 43. The light-emitting devices 41 may be semiconductor laser diodes (LDs) each generating optical signals attributed to wavelengths different from each other. The optical multiplexer 43 multiplexes the optical signals output from the light-emitting devices 41 into one wavelength multiplexed signal La. The other transmitter 42*b* has an arrangement same with the arrangement described above.

Referring back to FIG. 2A and FIG. 2B, the wavelength multiplexed signals, La and Lb, output from the DUTs, 40*a* and 40*b*, respectively, enter the optical de-multiplexer 12*a* and 12*b*, and are de-multiplexed thereby into respective four optical signals, La1 to La4 and Lb1 to Lb4, depending on the wavelengths.

[4:1 Selector]

The 4:1 selector 14*a*, that provides four input ports, Pa1 to Pa4, and one output port Pa5, selects one of the four optical signals, La1 to La4, receiving the four optical signals, La1 to La4, in respective input ports, Pa1 to Pa4, and outputs only one of the optical signals, La1 to La4, in the output port La5. Thus, the 4:1 selector 14*a* may select one of the optical signals, La1 to La4, output from the first DUT 40*a* as one optical component in the wavelength multiplexed signal La. The other 4:1 selector 14*b*, which has an arrangement same with the arrangement of the 4:1 selector 14*a*, may select one of the optical signals, Lb1 to Lb4, output from the second DUT 40*b* as one optical component in the wavelength multiplexed signal Lb, and provides thus selected one of the optical signals, Lb1 to Lb4, in the output port Pb5 thereof. The controller 10 may control and manage operation in the 4:1 selectors, 14*a* and 14*b*.

[2:2 Selector]

The 2:2 selector 16 provides two input ports, P1 and P2, and two output ports, P3 and P4. The input port P1 receives the output of the 4:1 selector 14*a*, while, the other input port P2 receives the output of the other 4:1 selector 14*b*. The 2:2 selector 16 also provides two input ports, P1 and P2, and two output ports, P3 and P4, where the input port P1 is connected with the output port Pa5 of the 4:1 selector 14*a*, while, the other input port P2 is coupled with the output port Pb5 of the other 4:1 selector 14*b*.

FIG. 2A, the 2:2 selector 16 has a configuration where the input port P1 couples with the output port P3, and the other input port P2 couples with the other output port P4. Thus, the output port P3 may output one of the optical signals, La1 to La4, output from the first DUT 40a, while, the other output port P4 may output one of the optical signals, Lb1 to Lb4, output from the second DUT 40b. On the other hand, another configuration of the 2:2 selector 16 shown in FIG. 2B couples the input port P1 with the output port P4, while, the other input port P2 with the output port P3. The configuration shown in FIG. 2A is often called as a parallel connection, while, that shown in FIG. 2B is called as a cross connection. Referring to FIG. 1, the output port P4 of the 2:2 selector 16 couples with the optical splitter 18 that splits an optical signal provided in the input port thereof into three parts that are to be entered in the test stations, 20b to 20d, while, the output port P3 is directly coupled with the test station 20a.

Thus, the 2:2 selector 16 couples one of the DUTs, 40a and 40b, with the test station 20a, while, the other with the other test stations, 20b to 20d. The controller 10 may control or manage the operation of the 2:2 selector 16, or the distribution of the DUTs, 40a and 40b, by the 2:2 selector 16.

[Test Stations]

Referring to FIG. 1, the test equipment 100 of the present invention provides a plurality of test stations, 20a to 20f, each testing one of the DUTs, 40a and 40b. The test stations, 20a to 20d, which evaluate the transmitter for the respective wavelengths, while, the test stations, 20e and 20f, evaluate the receiver in the DUTs, 40a and 40b.

The test stations, 20a to 20d, receives one of the optical signals, La1 to La4 and Lb1 to Lb4. The test station 20a may evaluate a waveform of the optical signals through eye diagrams thereof, namely, an eye opening, an extinction ratio, and a cross point of the optical signals, La1 to La4 and Lb1 to Lb4. The test station 20b, which is a type of an optical spectrum analyzer, evaluates a center wavelength of the optical signals, La1 to La4 and Lb1 to Lb4. The test station 20c, which may be an optical power meter, evaluates the strength of the optical signals, optical modulation amplitude (OMA), and an error from the true value. The test station 20d evaluates transmission sensitivity, namely, an error rate of the optical signals, La1 to La4 and Lb1 to Lb4.

The electrical signals, Sa and Sb, appearing in FIG. 1 are electrical signals output from the receivers in the DUTs, 40a and 40b. The test station 20e receives the electrical signal output from the first DUT 40a to evaluates the receiver in the first DUT 40a, while, the other test station 20f receives the electrical signal output from the other second DUT 40b to evaluate the receiver in the second DUT 40b.

The controller 10 changes testing parameters of the test stations, 20a to 20d, for the respective wavelengths. For instance, when the optical signal, La1 or Lb1, with the first wavelength is to be evaluated, the controller 10 sets or initializes parameters for the test stations, 20a to 20d, in those for the first wavelength. Also, when the optical signal, La1 or Lb2, with the second wavelength is to be evaluated, the controller 10 changes the parameters in the test stations, 20a to 20d, from those for the first wavelength to those for the second wavelength. Decrease of re-setting parameters in the test stations, 20a to 20d, becomes effective to shorten a tact time for evaluating a DUT.

[Evaluation]

Figure 4:
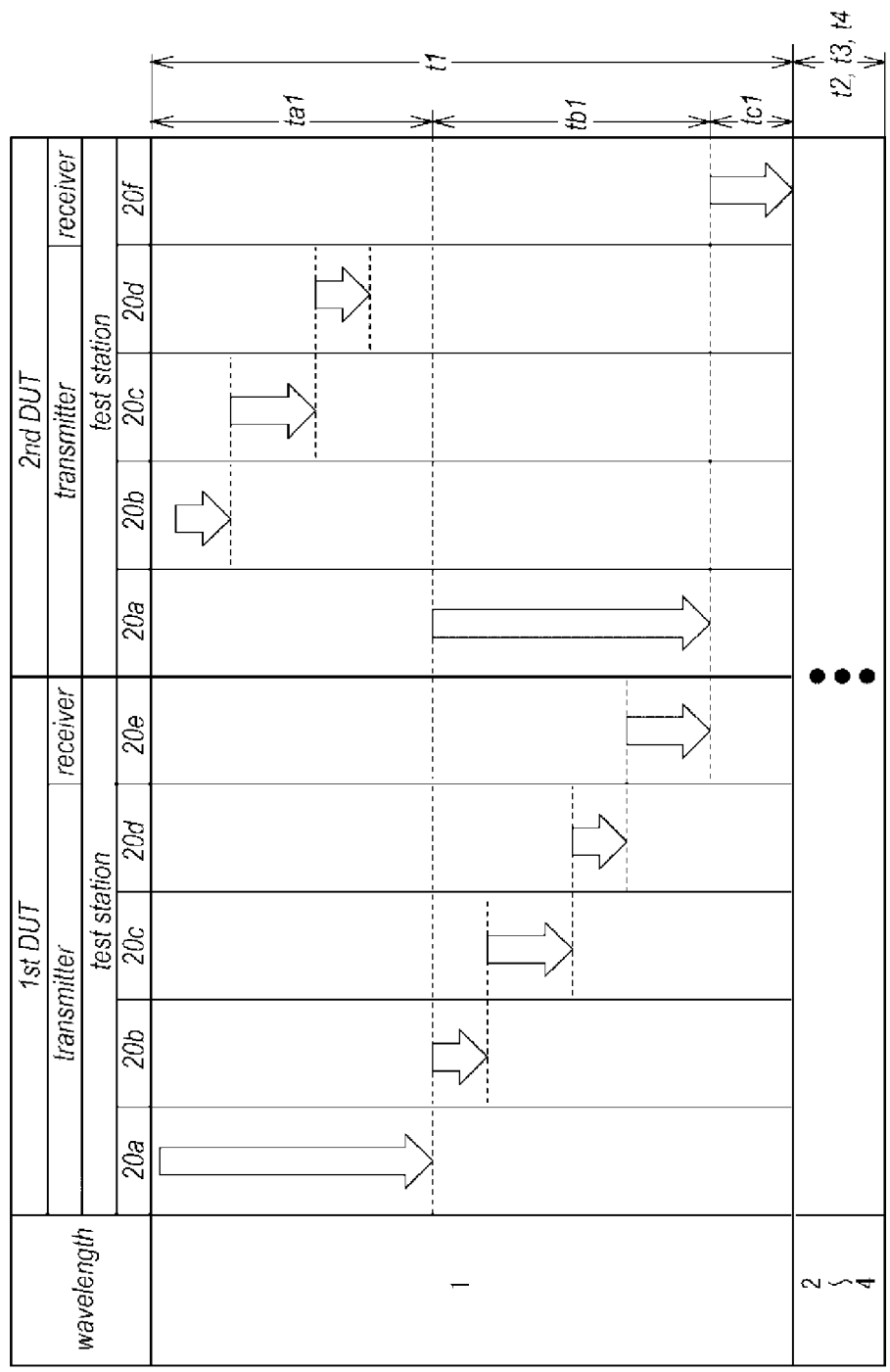
FIG. 4 shows sequences of the evaluation performed by the test equipment 100 of the embodiment.

FIG. 4 shows sequences of the evaluation performed by the test equipment 100 of the embodiment. The sequence first evaluates at the first wavelength, then, sequentially evaluates at the second, third, and fourth wavelengths, as shown in FIG. 4. The DUTs, 40a and 40b, are evaluated by the test stations, 20a to 20d, for the respective wavelengths. The test stations, 20a to 20d, evaluate the transmitters in the DUTs, 40a and 40b, while, the test stations, 20e and 20f, test the receivers in the DUTs, 40a and 40b.

Explaining the sequence shown in FIG. 4 in detail, a period t1 is prepared for the evaluation at the first wavelength. Both DUTs, 40a and 40b, simultaneously operate, that is, power are provided to both DUTs, 40a and 40b, concurrently, but the test stations, 20a to 20d, first test for the first DUT 40a; that is, the first DUT 40a is first evaluated in the optical waveform, the center wavelength, the optical output power, the error rate, and the receiver by the test stations, 20a, 20b, 20c, 20d, and 20e, respectively. Concurrently with the evaluation for the first DUT 40a, the second DUT 40b is also evaluated in the center wavelength, the optical output power, the error rate, the optical waveform, and the receiver in this order by the test stations, 20b, 20c, 20d, 20a, and 20f. All of those evaluations are carried out in the period t1 for the first wavelength.

During a period ta1 in the period t1, the test station 20a evaluates the optical waveform for the first DUT 40a and the test stations, 20b to 20d evaluate the center wavelength, the optical output power, and the error rate for the second DUT 40b. During a period tb1 after the period ta1, the test stations, 20b to 20d, and 20e evaluate the first DUT 40a, while, the test station 20a evaluates the second DUT 40b. During a period tc1 subsequent to the period tb1, the test station 20f evaluates the receiver in the second DUT 40b.

After the period t1 for evaluating at the first wavelength, the DUTs, 40a and 40b, are tested at the second wavelength during a period t2 subsequent to the period t1. Similarly, during periods, t3 and t4, subsequent to the period t2, the DUTs, 40a and 40b, are evaluated at the third and fourth wavelengths. In respective periods, t1 to t4, the turns of testing for the test stations, 20a to 20f, are same with those during the first period t1. All of those evaluation including the switching of the wavelengths in the respective periods, t1 to t4, and the order of the testing by the optical and test stations, 20a to 20f, are controlled and managed by the controller 10.

Figure 5:
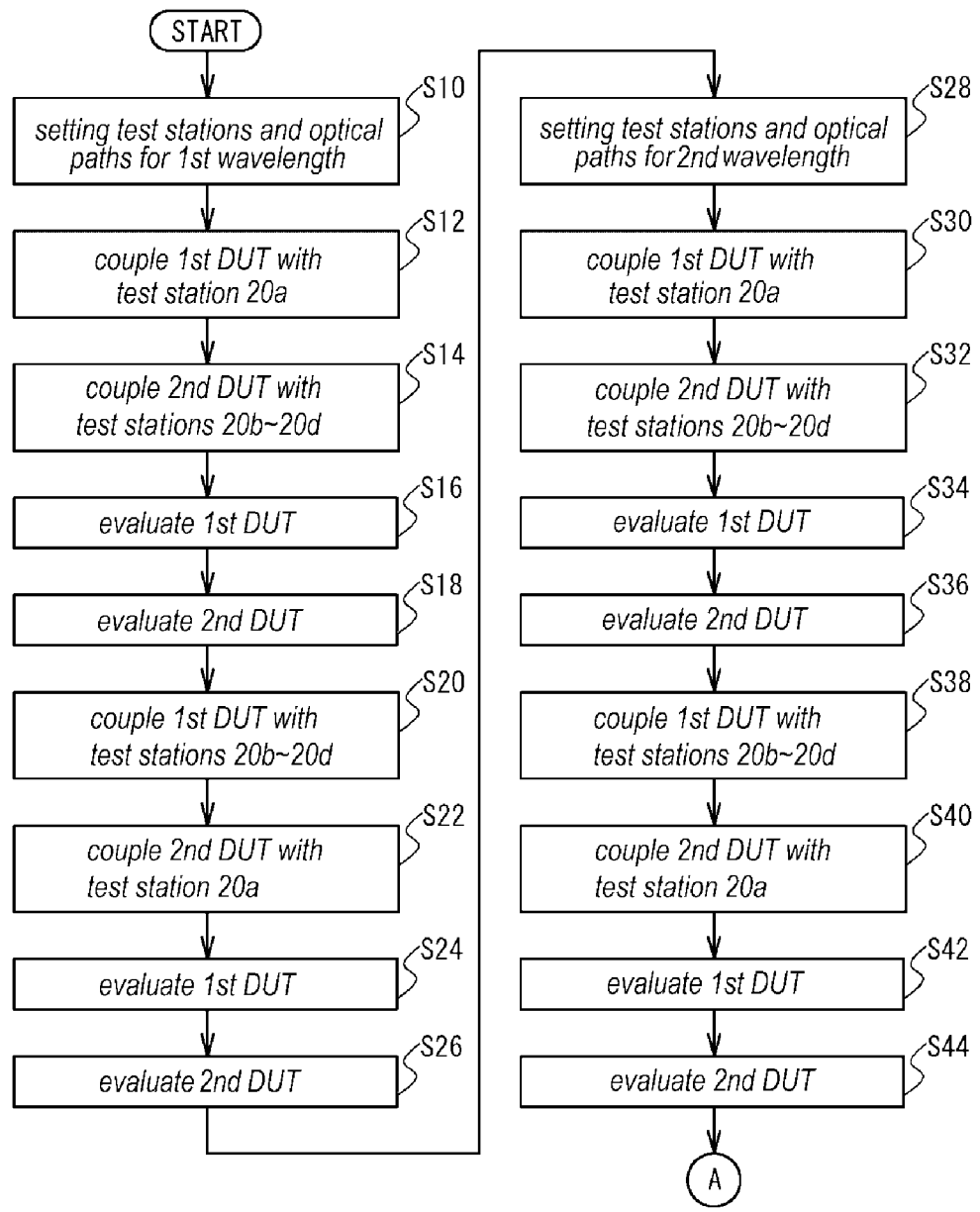
FIG. 5 shows a flow chart of an operation done by the test equipment 100 according to the present embodiment.
Figure 6:
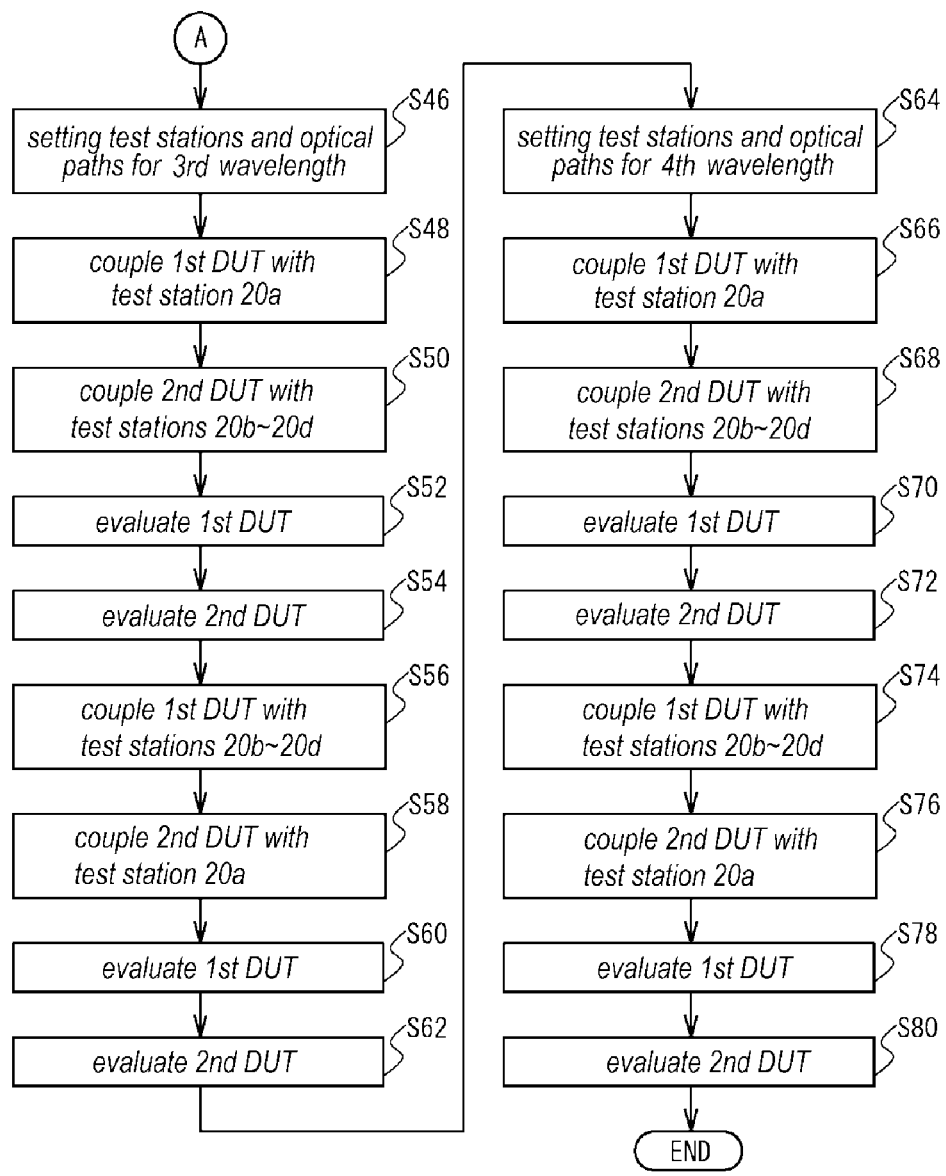
FIG. 6 shows a flow chart of an operation done by the test equipment 100 subsequent to the flow chart shown in FIG. 5, and FIG. 7 schematically shows a block diagram for evaluating optical losses from the DUT to the test station.

FIG. 5 and FIG. 6 show flow charts of an operation done by the test equipment 100 according to the present embodiment. As shown in FIG. 5, at step S10, the controller 10 first sets the test stations, 20a to 20f, coupling the first DUT 40a with test station 20a in the first wavelength at step S12 by connecting the input port Pa1 with the output port Pa5 in the first 4:1 selector 14a and the input port P1 with the output port P3 in the 2:2 selector 16. Thus, the optical signal La1, which is emitted from one of the light-emitting devices 41 in the first DUT 40a attributed to the first wavelength, enters the test station 20a through the first 4:1 selector 14a and the 2:2 selector 16.

Then, the controller 10 couples the second DUT 40b with the test stations, 20b to 20d, at step S14. Specifically, the controller 10 connects the input port Pb1 with the output port Pb5 in the second 4:1 selector 14b, and the input port P2 with the output port P4 in the 2:2 selector 16, where the 2:2 selector 16 configures the parallel connection shown in FIG. 2A. The optical signal Lb1, which is emitted from one of the light-emitting devices 41 in the second DUT 40b and attributed to the first wavelength, enters the test stations, 20b to 20d. Thus, the test station 20a evaluates the first DUT 40a at step S16, while, the test stations, 20b to 20d, concurrently evaluates the second DUT 40b, at step S18. The steps, S12 to S18, are performed in the period ta1 shown in FIG. 4.

Thereafter, the controller 10 couples the first DUT 40a with the test stations, 20b to 20d, while, the second DUT 40b with the test station 20a by connecting the input port P1 with the output P4 and the input port P2 with the output port P3 in the 2:2 selector 16 at step S20 and step S22, where the 2:2 selector 16 configures the cross connection shown in FIG. 2B. The optical signal La1 output from the first DUT 40 enters the test stations, 20b to 20d, while, the optical signal Lb1 enters the test station 20a. Then, the test stations, 20b to 20e, evaluates the first DUT 40a at step S24, while, the test stations, 20a and 20f, concurrently evaluates the second DUT 40b at step S26. The steps, S20 to S26, correspond to the periods, tb1 and tc1, shown in FIG. 4.

Thereafter, the controller 10 sets the test stations, 20a to 20d, and the optical paths for the second wavelength at step 28; then, the evaluations corresponding to the steps, S12 to S26, for the first and second DUTs, 40a and 40b, may be carried out at steps, S30 to S44. As shown in FIG. 6, the controller 10 sets the test stations, 20a to 20d, and the optical paths for the third wavelength at step S46. Thereafter, at steps, S48 to S62, perform the evaluations corresponding to the steps, S12 to S26, for the first and second DUTs, 40a to 40b. Thereafter, setting the test stations, 20a to 20d, and the optical paths for the fourth wavelength at step S64, the evaluations corresponding to the steps S12 to S26, are performed for the first and second DUTs, 40a and 40b, at steps, S66 to S80.

According to the embodiment thus described, the first and second DUTs, 40a and 40b, may be evaluated in the respective wavelengths. The controller 10 sets the test stations, 20a to 20d, and the optical paths thereof, in those corresponding to the first wavelength, then, evaluates the first and second DUTs, 40a and 40b, concurrently in the period t1 shown in FIG. 4 and the steps, S10 to S26, in FIG. 5. After the evaluations for the first wavelength is completed, the controller 10 changes the setting of the test equipment 100 in those corresponding to the second wavelength at step S28 to evaluates the first and second DUTs, 40a and 40b, in the second wavelength at steps S30 to S44. The evaluations of the first and second. DUTs, 40a and 40b, in the third and fourth wavelengths may be similarly carried out by the steps, S46 to S80. Thus, the evaluations for a wavelength are concurrently carried out at one period; then the test equipment is changed in the set up thereof to another wavelength. Accordingly, the number of changing the setup of the test equipment from one wavelength to another wavelength is just same with the number of the wavelengths multiplexed in the wavelength multiplexed signal, which is four (4) in the present embodiment.

A scheme where DUTs are independently evaluated takes an enough tact time because the number of settings in test stations increases. For instance, a procedure where the test equipment evaluates the first DUT 40a at respective four wavelengths, then, the second DUT 40b at the respective four wavelengths needs to the number of setting the test equipment in the test stations, 20a to 20d, and the optical paths thereof becomes eight (8), which inevitably takes enough time. The tact time for the evaluations becomes longer in proportional to the number of DUTs. The embodiment described above in the number of the setting of the test stations, 20a to 20d, and the optical paths, may be equal to the number of the wavelengths multiplexed in the wavelength multiplexed signal, which may shorten the tact time of the total evaluations. Moreover, even when three or more DUTs are necessary to be evaluated; the number of re-setting the test stations, 20a to 20d, and the optical paths is unchanged.

Also, the embodiment of the present invention may concurrently evaluate the first and second DUTs, 40a and 40b.

That is, the test station 20a evaluates the first DUT 40a through the optical signal La1, while, the test stations, 20b to 20d, evaluate the second DUT 40b through the optical signal Lb1 at the period ta1 and the steps, S12 to S18; then the test stations, 20b to 20d, evaluates the first DUT 40a using the optical signal La1, while, the test station 20a concurrently evaluates the second DUT 40b using the optical signal Lb1 by changing the configuration of the 2:2 selector 16 from the parallel connection to the cross connection during the period tb1 and the steps S20 to S26. Thus, the test equipment 100 may further shorten the tact time of the evaluation.

The test equipment 100 may change test items, and increase or decrease the test items by adding test stations and concurrently operating those added test stations. In particular, as shown in FIG. 4, a scheme where test items may be performed concurrently with another test item requiring an enough tact time becomes effective to shorten the tact time of the evaluation. In the present embodiment, the evaluation of the waveform performed at the test station 20a takes a longest tact time among other test items. Accordingly, the test stations, 20b to 20d, are preferably operated concurrently with the operation of the test station 20a.

The order of the evaluations is preferably same in the respective periods. For instance, the order of the evaluation shown in FIG. 4 in the period t1 for the first wavelength is preferably traced in the other periods, t2 o t4, for the second to fourth wavelengths. The controller 10 may iterate the operation in the respective periods, t1 to t4.

When the DUTs, 40a and 40b, are to be evaluated in the first wavelength, the controller 10 connects the input port Pa1 with the output port Pa5 and the input port Pb1 with the output port Pb5 in the respective 4:1 selectors, 14a and 14b, thereby the output port Pa5 provides the optical signal La1 and the output port Pb5 provides the optical signal Lb1. When the DUTs, 40a and 40b, are to be evaluated in the second to third wavelengths, the controller 10 may select one of the input ports, Pa2 to Pa4, to be coupled with the output port Pa5, and one of the input ports, Pb2 to Pb4, to be coupled with the output port Pb5, in the respective 4:1 selectors, 14a and 14b. That is, the 4:1 selectors, 14a and 14b, may select one of the wavelengths to be evaluated.

The controller 10 may select the configuration in the 2:2 selector 16. That is, the parallel connection in the 2:2 selector 16 shown in FIG. 2A connects the input port P1 with the output port P3 and the input port P2 with the output port P4. Thus, the test station 20a may evaluate the first DUT 40a, while, the test stations, 20b to 20d, may evaluate the second DUT 40b during the period ta1. Also, the cross connection shown in FIG. 2B connects the input port P1 with the output port P4 and the input port P2 with the output port P3 in the 2:2 selector 16. Then, the test station 20a may evaluate the second DUT 40b while the test stations, 20b to 20d, may evaluate the first DUT 40a during the period tb1. Depending on the number of the test items and the number of the DUTs, the test equipment may increase and modify configuration of the 4:1 selector and the 2:2 selector.

During the period t1 where the test stations, 20a to 20d, evaluates the transmitters, 42a and 42b, in the respective DUTs, 40a and 40b, at the first wavelength, the test stations, 20e and 20f, evaluate the receivers, 44a and 44b, in the DUTs, 40a and 40b, respectively, at the first wavelength. Similar evaluations for the receivers, 44a and 44b, may be performed in other wavelengths. Thus, the procedure of the present invention sequentially evaluates the transmitter and the receiver at one wavelength, which may decrease the re-setting of the test stations and the optical paths for the respective wavelengths.

The optical paths in the test equipment thus described may be optical fibers, and strengths of optical signals carried on the optical paths inevitably decreases due to optical losses of the optical fibers and optical couplings between optical elements. Accordingly, the test equipment 100 preferably evaluates optical losses in the respective optical paths and corrects evaluations results by the optical losses.

Figure 7:
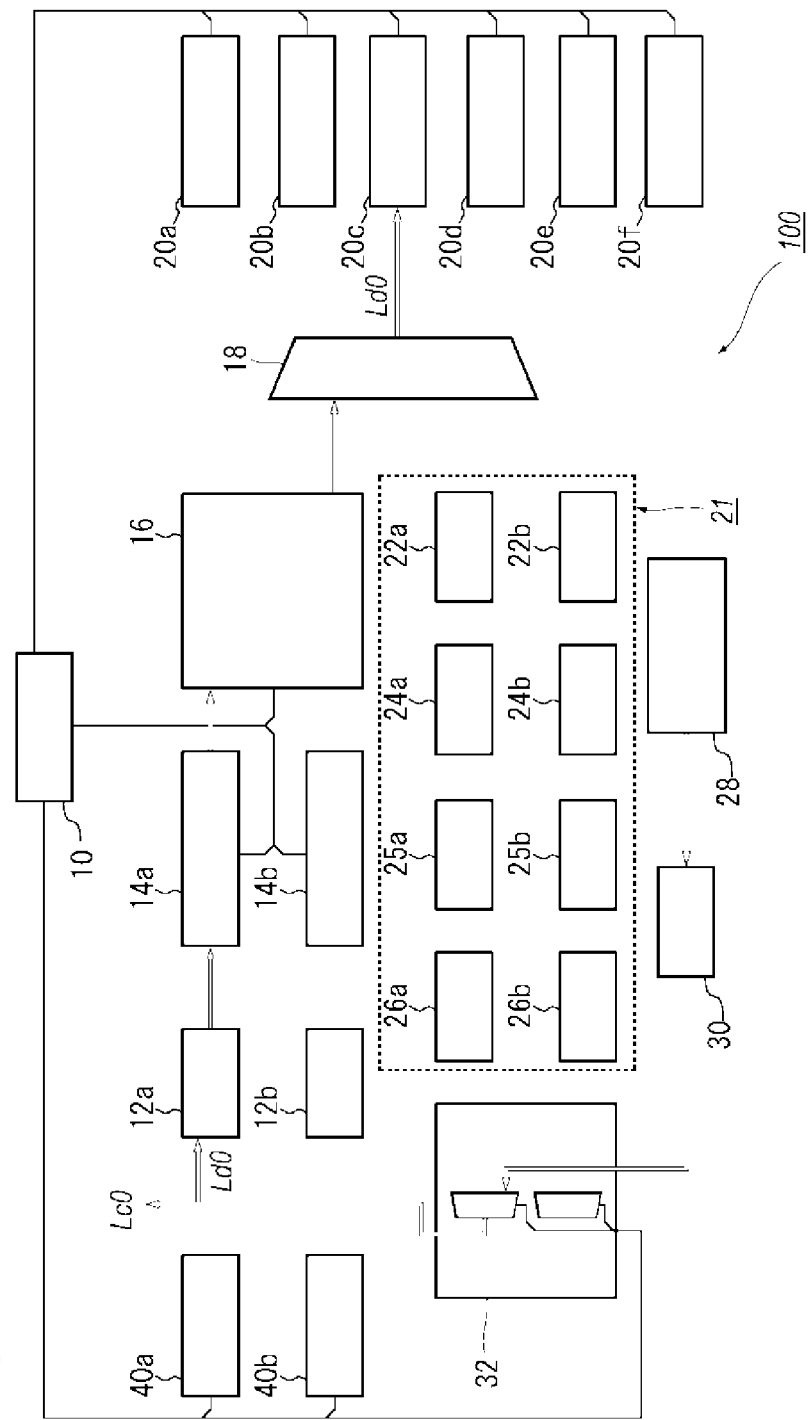

FIG. 7 schematically shows a block diagram for evaluating optical losses from the DUTs, 40a and 40b, to the test stations, 20a to 20d, in the test equipment 100. As shown in FIG. 7, the optical source 21 is suspended but the supplemental optical source 28 generates an optical signal with enough strength, which enters the 3 to 2 selector 32 through the optical amplifier 30. The test equipment splits the optical signal output from the 3 to 2 selector 32 into two signals, Lc0 and Ld0, each having optical strengths comparable to each other at the output of the 3 to 2 selector 32. One of the optical signals Lc0, which does not pass the optical paths to the test stations 20c, namely, the optical signal Lc0 receives no influence of the optical paths from the DUT, 40a and 40b, to the test station 20c. While, the other optical signal Ld0 passes the optical de-multiplexer 12a, the 4:1 selector 14a, the 2:2 selector 16, and the optical splitter 18 to the test station 20c, that is, the optical signal Ld0 is influenced by optical loss in the optical paths from the DUTs, 40a and 40b, to the test station 20c.

The controller 10 may provide a function of correcting the optical losses in the optical paths. That is, the controller 10 calculates a difference in the strength between the optical signal Lc0 regarded as no loss and the optical signal Ld0 after influenced by the optical losses, and set the difference in the storage. When the controller 10 evaluates the strength of the optical signals, La1 to La4 and Lb1 to Lb4, by the test station 20c, the optical losses thus calculated and stored are used for evaluating true strengths of the optical signals. Thus, the test equipment 100 may enhance the accuracy of the evaluating results.

The optical signal Ld0 is necessary to pass at least a portion of the optical path from the DUT 40a to the test station 20c, but preferably pass a whole portion of the optical paths, which enhances the accuracy of the optical strength evaluated in the test station 20c. Optical losses attributed to other optical paths, for instance, other paths from the optical de-multiplexer 12 to the 1 to 4 selector 14a attributed to the optical signals, La2 to La4, or from the other DUT 40b to the test station 20c, may be evaluated through the procedures same with the above procedure.

In the foregoing detailed description, the test equipment of the present invention has been described with reference to specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A test equipment for evaluating first and second optical modules processing wavelength multiplexed signals that multiplex optical signals each having wavelengths different from each other, the wavelengths attributed to the first optical module and the wavelengths attributed to the second optical module being equal to each other, the test equipment comprising:

an optical waveform analyzer that performs a first evaluation for the first and second optical modules using one of the optical signals output from the first optical module and another one of the optical signals output from the second optical module, respectively;

an optical spectrometer that performs a second evaluation for the first and second optical modules using the one of the optical signals and the another one of the optical signals, respectively; and a controller that controls a turn of the first evaluation and the second evaluation, and wherein the optical waveform analyzer and the optical spectrometer concurrently perform the first evaluation for the first optical module and the second evaluation for the second optical module, respectively, in a first period and concurrently perform the second evaluation for the first optical module and the first evaluation for the second module, respectively, during a second period subsequent to the first period, and wherein the first evaluations and the second evaluations for the first optical module and the second optical module are iterated with respect the respective wavelengths.

2. The test equipment according to claim 1, further comprising a selector that provides input ports and an output port, the input ports each receiving the optical signals output from one of the first optical module and the second optical module, the output port being optically coupled with only one of the input ports, wherein the controller selects one of the input ports to be optically coupled with the output port in the respective wavelengths.

3. The test equipment according to claim 1, further comprising a 2:2 selector that provides two input ports and two output ports, the two input ports being optically coupled with the first optical module and the second optical module, respectively, the two output ports being coupled with the optical waveform analyzer and the optical spectrometer, respectively, wherein one of the input ports coupled with the first optical module is coupled with one of the output ports coupled with the optical waveform analyzer and other of the input ports coupled with the second optical module is coupled with other of the output ports coupled with the optical spectrometer at the first period, and wherein the one of the input ports coupled with the first optical module is coupled with the other of the output ports coupled with the optical spectrometer and the other of the input ports coupled with the second optical module is coupled with the one of the output ports coupled with the optical waveform analyzer at the second period.

4. The test equipment according to claim 1, further comprising a third test station, wherein the first optical module and the second optical module each provide a receiver that receives respective wavelength multiplexed signals, and wherein the third test station evaluates the receivers in the first optical module and the second optical module in the second period.

5. The test equipment according to claim 1, wherein the controller corrects optical losses attributed to an optical path from the first optical module and the second optical module to one of the optical waveform analyzer and the optical spectrometer.

6. The test equipment according to claim 1,
wherein the optical waveform analyzer evaluates an eye opening, an extinction ratio, and a cross point of an optical signal entering therein by an eye diagram thereof.

7. A process of evaluating a first optical module and a second optical module that process wavelength multiplexed signals that multiplex optical signals each having wavelengths specific thereto and different from each other, the process comprising steps of:
(a) selecting one of the wavelengths;
(b) providing one of the optical signals having the one of the wavelengths output from the first optical module to an optical waveform analyzer and another one of the optical signals having the one of the wavelengths output from the second optical module to an optical spectrometer;
(c) concurrently performing a first evaluation for the first optical module at the optical waveform analyzer using the one of the optical signals and a second evaluation for the second optical module at the optical spectrometer using the another one of the optical signals in a first period;
(d) concurrently performing the first evaluation for the second optical module at the optical waveform analyzer using the another one of the optical signals and the second evaluation for the first optical module at the optical spectrometer using the one of the optical signals in a second period subsequent to the first period; and
iterating the steps (a) to (d) for the respective wavelengths.

8. The process according to claim 7,
wherein the step (b) is carried out by a first selector and a second selector, the first selector and the second selector each having input ports and one output port optically coupled with only one of the input ports,
wherein the optical signals output from the first optical module enter the respective input ports of the first selector and the optical signals output from the second optical module enter the respective input ports of the second selector.

9. The process according to claim 8,
wherein the steps (c) and (d) are carried out by a 2:2 selector that provides two input ports and two output ports, the two input ports coupling with the output ports of the first selector and the second selector, the two output ports coupling with the optical waveform analyzer and the optical spectrometer,
wherein the step (c) couples the first input port with the first output port and the second input port with the second output port, and
wherein the step (d) couples the first input port with the second output port and the second input port with the first output port.

10. The process according to claim 7,
wherein the optical waveform analyzer evaluates an eye opening, an extinction ratio, and a cross point of an optical signal entering therein by an eye diagram thereof, and
wherein the step (c) evaluates the eye opening, the extinction ratio, and the cross point in the eye diagram of the one of the optical signals coming from the first optical module by the optical waveform analyzer and a center wavelength, an optical strength, and an error rate of the one of the optical signals coming from the second optical module by the optical spectrometer, an optical power meter, and an error rate detector, in the first period, and
wherein the step (d) evaluates the eye opening, the extinction ratio, and the cross point in the eye diagram of the one of the optical signals coming from the second optical module by the optical waveform analyzer and the center wavelength, the optical strength, and the error rate of the one of the optical signals coming from the first optical module by the optical spectrometer, the optical power meter, and the error rate detector, in the second period.

11. The test equipment according to claim 1,
further comprising an optical power meter that performs a third evaluation for the first and second optical modules using the one of the optical signals and the other one of the optical signals, respectively,
wherein the controller controls a turn of the first evaluation and the third evaluation,
wherein the optical waveform analyzer and the optical power meter concurrently perform the first evaluation for the first optical module and the third evaluation for the second optical module, respectively, in the first period and concurrently perform the third evaluation for the first optical module and the first evaluation for the second module, respectively, during the second period subsequent t to the first period, and
wherein the first evaluations and the third evaluations for the first optical module and the second optical module are iterated with respect the respective wavelengths.

12. The test equipment according to claim 11,
further comprising an error rate detector that performs a fourth evaluation for the first and second optical modules using the one of the optical signals and the other one of the optical signals, respectively,
wherein the controller controls a turn of the first evaluation and the fourth evaluation,
wherein the optical waveform analyzer and the error rate detector concurrently perform the first evaluation for the first optical module and the fourth evaluation for the second optical module, respectively, in the first period and concurrently perform the fourth evaluation for the first optical module and the first evaluation for the second module, respectively, during the second period subsequent t to the first period, and
wherein the first evaluations and the forth evaluations for the first optical module and the second optical module are iterated with respect the respective wavelengths.

13. The test equipment according to claim 12,
further comprising an optical splitter coupled with three test stations which includes the optical spectrometer, the optical power meter, and the error rate detector, the optical splitter being configured to split the one of the optical signals or the other one of the optical signals provided in an input port thereof into each test station of the three test stations.

14. The test equipment according to claim 13,
further comprising a 2:2 selector that provides two input ports and two outputs ports, the two input ports being optically coupled with the first optical module and the second optical module, respectively, one of the two output ports being coupled with the optical wave analyzer and other of the two output ports being coupled with the three test stations through the optical splitter,
wherein one of the input ports coupled with the first optical module is coupled with one of the output ports coupled with the optical waveform analyzer and other of the input ports coupled with the second optical module is coupled with other of the output ports coupled with the three test stations through the optical splitter at the first period, and wherein the one of the input ports coupled with the first optical module is coupled with the other of the output ports coupled with the three test stations through the optical splitter and the other of the input ports coupled with the second optical module is coupled with the one of the output ports coupled with the optical waveform analyzer at the second period.

15. A test equipment for evaluating first and second optical modules processing wavelength multiplexed signals that multiplex optical signals each having wavelengths different from each other, the wavelengths attributed to the first optical module and the wavelengths attributed to the second optical module being equal to each other, the test equipment comprising:

an optical waveform analyzer that performs a first evaluation for the first and second optical modules using one of the optical signals output from the first optical module and another one of the optical signals output from the second optical module, respectively;

an optical power meter that performs a second evaluation for the first and second optical modules using the one of the optical signals and the another one of the optical signals, respectively; and a controller that controls a turn of the first evaluation and the second evaluation, and wherein the optical waveform analyzer and the optical power meter concurrently perform the first evaluation for the first optical module and the second evaluation for the second optical module, respectively, in a first period and concurrently perform the second evaluation for the first optical module and the first evaluation for the second module, respectively, during a second period subsequent to the first period, and wherein the first evaluations and the second evaluations for the first optical module and the second optical module are iterated with respect the respective wavelengths.

16. The test equipment according to claim 15, further comprising a selector that provides input ports and an output port, the input ports each receiving the optical signals output from one of the first optical module and the second optical module, the output port being optically coupled with only one of the input ports, wherein the controller selects one of the input ports to be optically coupled with the output port in the respective wavelengths.

17. The test equipment according to claim 15, further comprising a 2:2 selector that provides two input ports and two output ports, the two input ports being optically coupled with the first optical module and the second optical module, respectively, the two output ports being coupled with the optical waveform analyzer and the optical power meter, respectively, wherein one of the input ports coupled with the first optical module is coupled with one of the output ports coupled with the optical waveform analyzer and other of the input ports coupled with the second optical module is coupled with other of the output ports coupled with the optical power meter at the first period, and wherein the one of the input ports coupled with the first optical module is coupled with the other of the output ports coupled with the optical power meter and the other of the input ports coupled with the second optical module is coupled with the one of the output ports coupled with the optical waveform analyzer at the second period.

18. The test equipment according to claim 15, further comprising a third test station, wherein the first optical module and the second optical module each provide a receiver that receives respective wavelength multiplexed signals, and wherein the third test station evaluates the receivers in the first optical module and the second optical module in the second period.

19. The test equipment according to claim 15, wherein the controller corrects optical losses attributed to an optical path from the first optical module and the second optical module to one of the optical waveform analyzer and the optical power meter.

20. The test equipment according to claim 15, wherein the optical waveform analyzer evaluates an eye opening, an extinction ratio, and a cross point of an optical signal entering therein by an eye diagram thereof.

* * * * *